US009552406B2

(12) United States Patent
Olsen et al.

(10) Patent No.: US 9,552,406 B2
(45) Date of Patent: Jan. 24, 2017

(54) METHOD AND SYSTEM FOR SANDBOX VISIBILITY

(71) Applicant: SCHLUMBERGER TECHNOLOGY CORPORATION, Sugar Land, TX (US)

(72) Inventors: Todd Olsen, Spring, TX (US); Vincent Bergbauer, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 61 days.

(21) Appl. No.: 14/228,337

(22) Filed: Mar. 28, 2014

(65) Prior Publication Data

US 2014/0297587 A1    Oct. 2, 2014

Related U.S. Application Data

(60) Provisional application No. 61/806,706, filed on Mar. 29, 2013.

(51) Int. Cl.
 *G06F 17/30* (2006.01)
 *G06F 21/64* (2013.01)

(52) U.S. Cl.
 CPC ... *G06F 17/30575* (2013.01); *G06F 17/30578* (2013.01); *G06F 21/64* (2013.01)

(58) Field of Classification Search
 CPC .................................................. G06F 17/30575
 See application file for complete search history.

(56) References Cited

U.S. PATENT DOCUMENTS

| 8,166,101 B2* | 4/2012 | Shah ................. G06F 17/30595 709/203 |
| 8,224,783 B1* | 7/2012 | Burleigh .......... G06Q 10/06311 707/654 |

(Continued)

FOREIGN PATENT DOCUMENTS

WO    2014160996 A1    10/2014

OTHER PUBLICATIONS

Unknown Author, "The Studio knowledge environment—working with Petrel information", XP055166145; Retrieved from the Internet: http://www.digitalenergyjournal.com/nThe_Studio_knowledge_environment_working_with_Petrel_information/960394a7.aspx; Retrieved on Jan. 30, 2015; Aug. 6, 2013, 3 pages.

(Continued)

*Primary Examiner* — Apu Mofiz
*Assistant Examiner* — Cindy Nguyen
(74) *Attorney, Agent, or Firm* — Colin Wier; Alec McGinn; Mitch Blakely

(57) ABSTRACT

A method for local data visibility is disclosed. The method includes detecting data items in a local data repository located in a local environment. In response to the detecting, a computer processor of the local environment collects metadata describing the data items in the local data repository. The metadata includes a project identifier. The metadata is then transmitted, separate from the data items, to a data manager of a database, where the database is accessible by multiple local environments. Accordingly, the data manager determines, based on the project identifier, a synchronization status of the data items in the local data repository, where the synchronization status represents a relationship between the data items in the local data repository and exploration and production data in the database. The data manager further generates, according to a pre-determined (Continued)

data management scheme, an alert based on the synchronization status.

20 Claims, 6 Drawing Sheets

(56) References Cited

U.S. PATENT DOCUMENTS

| | | |
|---|---|---|
| 2005/0228725 A1 | 10/2005 | Rao et al. |
| 2006/0206768 A1 | 9/2006 | Varghese |
| 2009/0138568 A1 | 5/2009 | Sollicito et al. |
| 2009/0265110 A1 | 10/2009 | Narayanan et al. |
| 2009/0265395 A1 | 10/2009 | Milne |
| 2011/0258007 A1 | 10/2011 | Heggelund et al. |

OTHER PUBLICATIONS

Croll, et al., "Could They Do It?: Real User Monitoring: Chapter 10—Complete Web Monitoring", O'Reilly Media, Inc.: Retrieved from the Internet: http://archive.oreilly.com/pub/a/web-development/excerpts/9780596155131/chapter-10.html, Jun. 1, 2009, 15 pages.
Shukla, et al., "Aspect-Oriented Programming Enables Better Code Encapsulation and Reuse", MSDN Magazine, Retrieved from the Internet: https://msdn.microsoft.com/en-us/megazine/cc301356.aspx, Mar. 1, 2002, 5 pages.
Slavens, et al., "IBM Lotus Connections 2.5 Reviewer's Guide", Aug. 2009, 62 pages.
Extended European Search Report issued in EP application 14185820.9 on Feb. 2, 2015, 12 pages.
Office Action issued in related EP application 14185820.9 on Mar. 30, 2015, 2 pages.
International Search Report and Written Opinion issued in related PCT application PCT/US2014/032350 on Jul. 24, 2014, 9 pages.
Office Action issued in related EP application No. 14775024.4 on Feb. 26, 2016, 6 pages.
European Search Report issued in related EP application No. 14775024.4 on Feb. 12, 2016, 4 pages.

\* cited by examiner

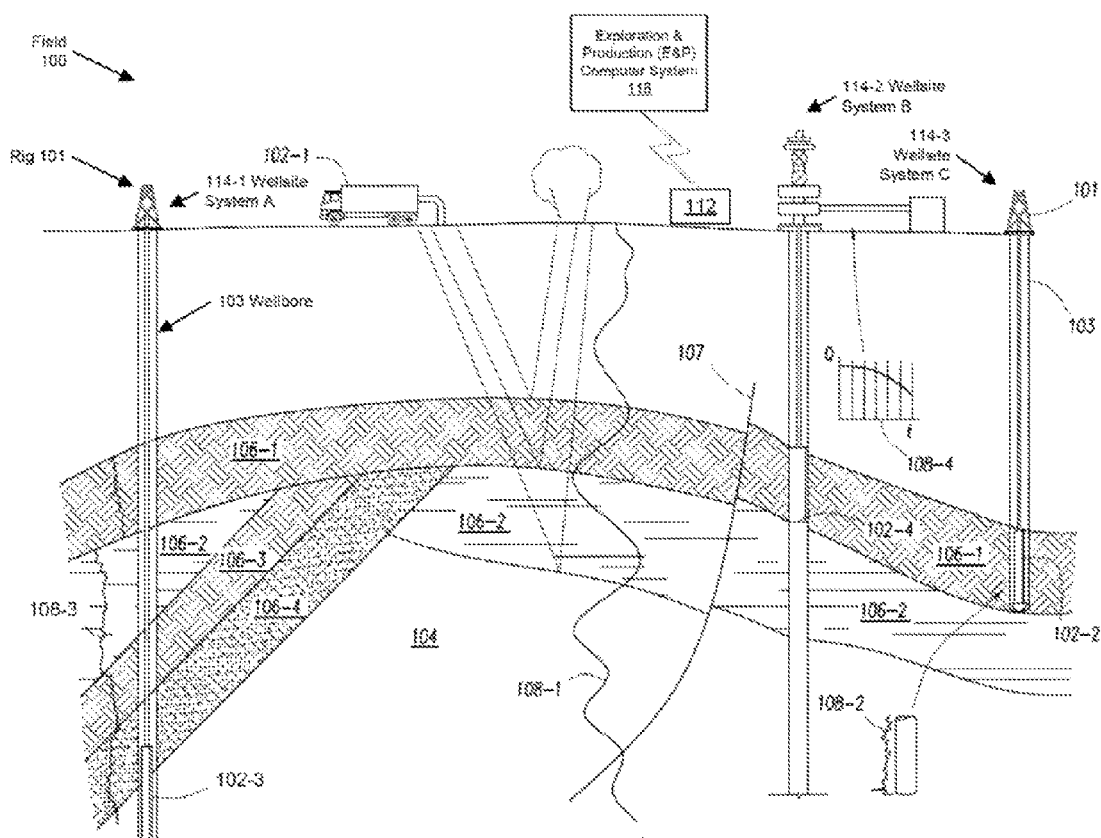
FIG. 1.1

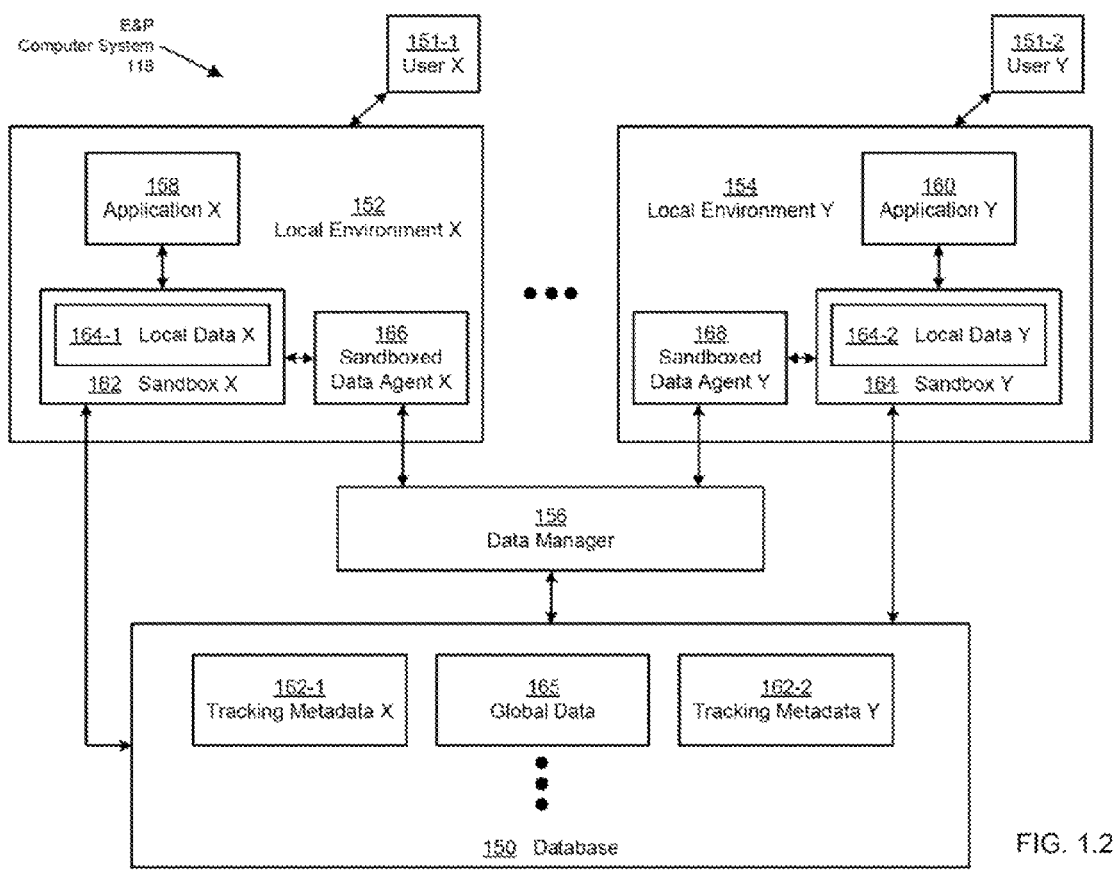
FIG. 1.2

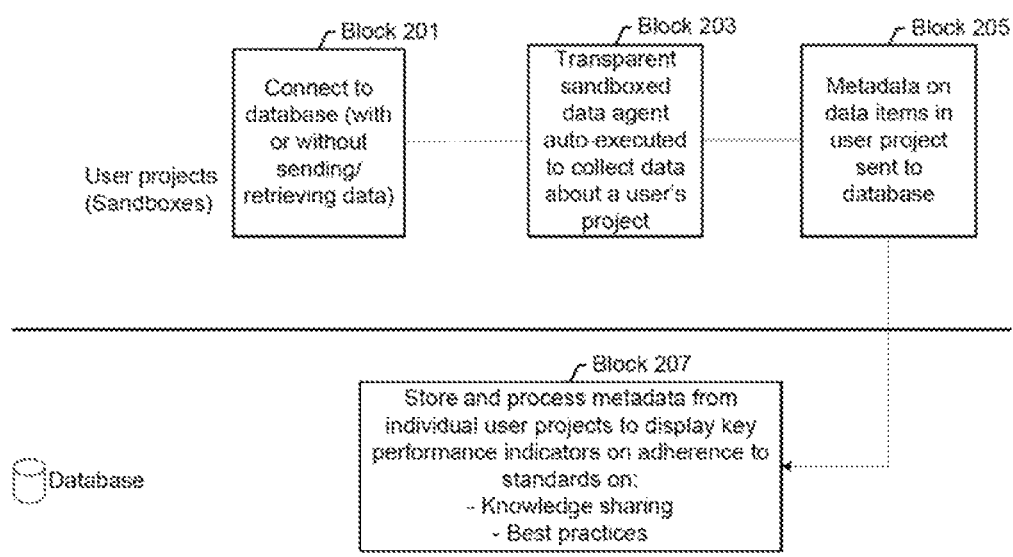
FIG. 3.1

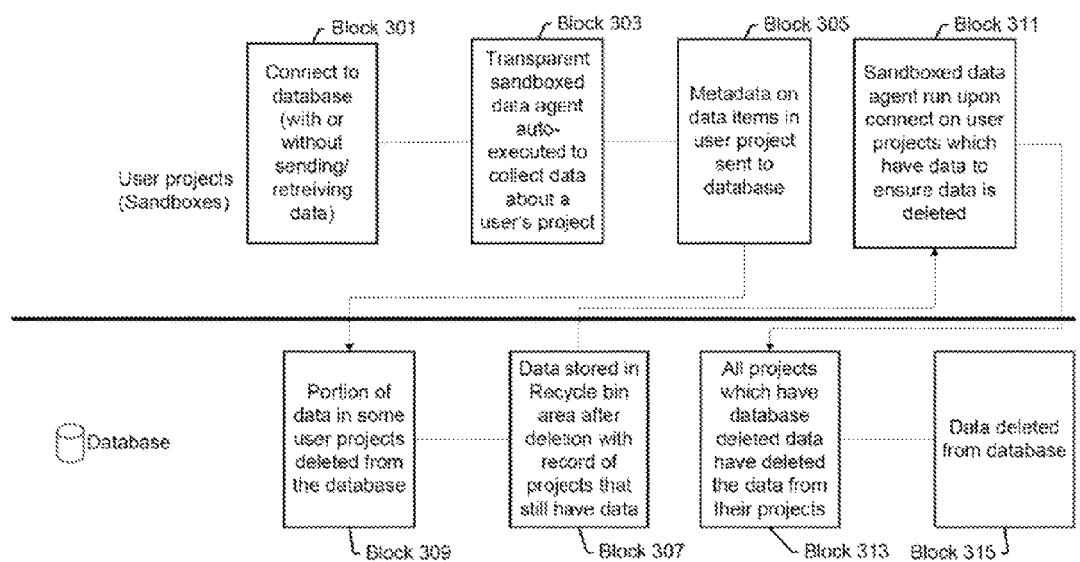
FIG. 3.2

METHOD AND SYSTEM FOR SANDBOX VISIBILITY

CROSS REFERENCE TO RELATED APPLICATIONS

This application claims priority under 35 U.S.C. §119(e) from Provisional Patent Application No. 61/806,706 filed Mar. 29, 2013, entitled "METHOD AND SYSTEM FOR SANDBOX VISIBILITY," which is hereby incorporated by reference in its entirety.

BACKGROUND

In the exploration and production (E&P) world, data volumes may be large. The data volumes may be used in interpretation applications to make decisions to find fluids, including hydrocarbons such as oil and gas, in earth formations. Based on the size of data volumes, databases are often used to store raw and interpreted information. Besides scalability and ability to handle large data volumes, databases may also ensure data is kept unique while multiple people are loading and using data from the database.

SUMMARY

In general, in one aspect, the invention relates to a method for local data visibility. The method includes detecting data items in a local data repository located in a local environment. In response to detecting the data items, a computer processor of the local environment collects metadata describing the data items in the local data repository. The metadata includes a project identifier. The metadata is then transmitted, separate from the data items, to a data manager of a database that is accessible by multiple local environments. The data manager determines, based on the project identifier, a synchronization status of the data items in the local data repository, where the synchronization status represents a relationship between the data items in the local data repository and exploration and production data in the database. The data manager further generates, according to a pre-determined data management scheme, an alert based on the synchronization status.

Other aspects will be apparent from the following description and the appended claims. This summary is provided to introduce a selection of concepts that are further described below in the detailed description. This summary is not intended to identify key or essential features of the claimed subject matter, nor is it intended to be used as an aid in limiting the scope of the claimed subject matter

BRIEF DESCRIPTION OF DRAWINGS

The appended drawings illustrate several embodiments of method and system for sandbox visibility and are not to be considered limiting of its scope, for method and system for sandbox visibility may admit to other equally effective embodiments.

FIG. 1.1 is a schematic view, partially in cross-section, of a field in which one or more embodiments of method and system for sandbox visibility may be implemented.

FIG. 1.2 shows a schematic diagram of a system in accordance with one or more embodiments.

FIGS. 3.1 and 3.2 show schematic diagrams of example operations in accordance with one or more embodiments.

DETAILED DESCRIPTION

Figure 2:
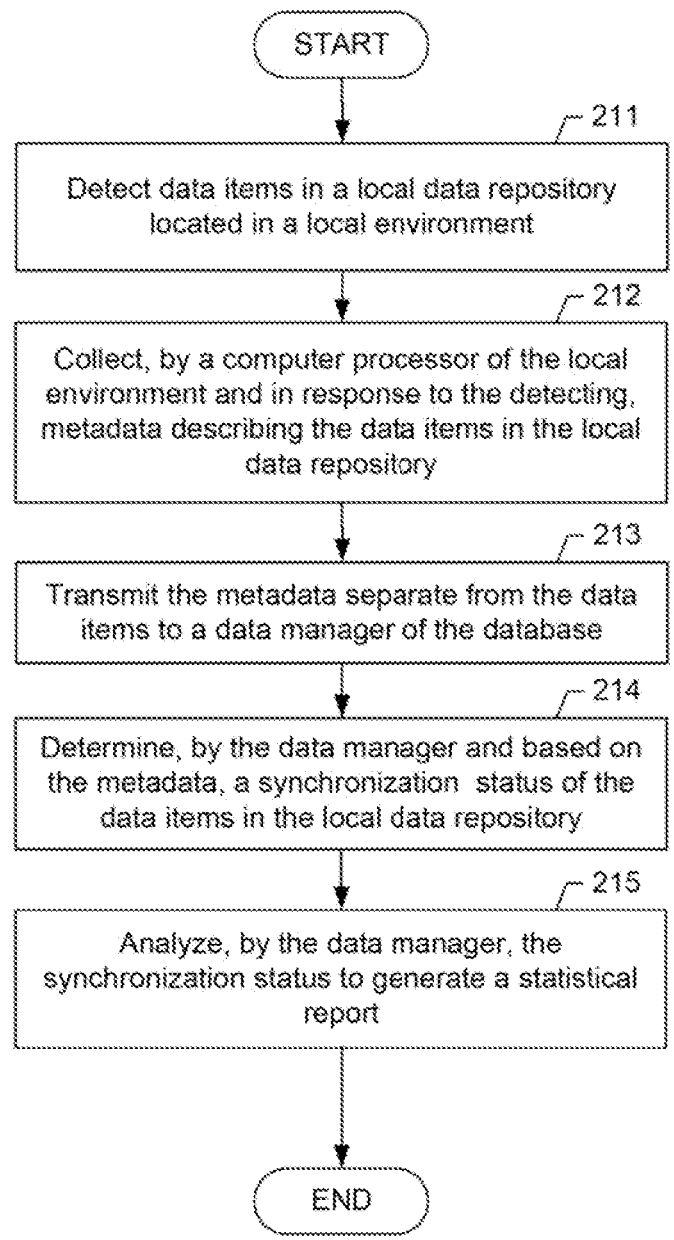
FIG. 2 shows a flowchart of a method in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have, not been described in detail to avoid unnecessarily complicating the description.

In general, embodiments provide a method and system for sandbox visibility. Specifically, embodiments collect metadata about data items that are stored in a sandbox. In certain embodiments, the data items correspond to Exploration and Production (E&P) data in a database. For example, the data items may be copies of data stored in the database. By way of another example, the data items may be data that is to be stored in the database (e.g., after an application manipulates the data). One or more embodiments transmit the metadata to a data manager of the database. Based on the transmitted metadata, data items in the sandbox may be updated based on a global management scheme.

E&P applications may manipulate and store data in the E&P applications' local environments before uploading data to the database. The manipulation and storage in the local environment may be facilitated through the concept of a sandbox user project. With a sandbox, users may load data from a database and manipulate the data without considering the manipulation's impact to other users of the data. When the user is ready, interpreted data may be synchronized from a local sandbox environment to the database.

At least some embodiments of sandbox visibility provide for knowledge management, cascading major updates, and/or preventing deterioration of data in sandboxes. With respect to knowledge management, at least some embodiments provide a mechanism for evaluating the effectiveness of users sharing data and knowledge with other users through the use of the database to make the knowledge available. With respect to major updates, at least some embodiments provide a mechanism for cascading major updates (particularly deletes) to data in either a user's local project or the database to other users of the data based on the potentially isolated nature of data in sandboxes. With respect to best practices, at least some embodiments provide a mechanism for preventing deterioration of data as users transfer data between and directly into sandboxes without storing the data in the database. If not standardized or organized according to an organization's best practices, data in a sandbox may quickly deteriorate in terms of standardization and organization as multiple persons work with data that may not be passed through the database where rules exist to control quality.

FIG. 1.1 depicts a schematic view, partially in cross section, of a field (100) in which one or more embodiments of method and system for sandbox visibility may be implemented. In one or more embodiments, one or more of the modules and elements shown in FIG. 1.1 may be omitted, repeated, and/or substituted. Accordingly, embodiments of method and system for sandbox visibility should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an E&P computer system (118). The subterranean formation (104) includes several geological structures, such as a sandstone layer (106-1), a limestone layer (106-2), a shale layer (106-3), a sand layer (106-4) and a fault line (107).

In one or more embodiments, data acquisition tools (102-1), (102-2), (102-3), and (102-4) are positioned at various locations along the field (100) for collecting data of the subterranean formation (104), referred to as survey operations. In particular, these data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by these data acquisition tools. Specifically, the static data plot (108-1) is a seismic two-way response time. Static plot (108-2) is core sample data measured from a core sample of the formation (104). Static data plot (108-3) is a logging trace, referred to as a well log. Production decline curve or graph (108-4) is a dynamic data plot of the fluid flow rate over time. Other data may also be collected, such as historical data, user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig, (101), a wellbore (103), and drilling equipment to perform drilling operation. Similarly, the wellsite system B (114-2) and wellsite system C (114-3) are associated with respective rigs, wellbores, other wellsite equipment, such as production equipment and logging equipment to perform production operation and logging operation, respectively. Generally, survey operations and wellbore operations are referred to as field operations of the field (100). In addition, data acquisition tools and wellsite equipment are referred to as field operation equipment. These field operations may be performed as directed by a surface unit (112). For example, the field operation equipment may be controlled by a field operation control signal sent from the surface unit (112).

In one or more embodiments, the surface unit (112) is operatively coupled to the data acquisition tools (102-1), (102-2), (102-3), (102-4), and/or the wellsite system (114-1), (114-2), (114-3). In particular, the surface unit (112) is configured to send commands to the data acquisition tools (102-1), (102-2), (102-3), (102-4), and/or the wellsite system (114-1), (114-2), (114-3) and to receive data therefrom. In one or more embodiments, surface unit (112) may be located at the wellsite system (114-1), (114-2), (114-3) and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system (114-1), (114-2), (114-3), and/or other part of the field (104). The surface unit (112) may also be provided with or functionally for actuating mechanisms at the field (100). The surface unit (112) may send command signals to the field (100) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing seismic interpretation or borehole resistivity image log interpretation to identify geological surfaces in the subterranean formation (104) or performing simulation, planning, and optimization of production operations of the wellsite system (114-1), (114-2), (114-3). In one or more embodiments, the result generated by the E&P computer system (118) may be displayed for user viewing using a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

FIG. 1.2 shows more details of the E&P computer system (118) in which one or more embodiments of method and system for sandbox visibility may be implemented. In one or more embodiments, one or more of the modules and elements shown in FIG. 1,2 may be omitted, repeated, and/or substituted. Accordingly, embodiments of method and system for sandbox visibility should not be considered limited to the specific arrangements of modules shown in FIG. 1.2.

As shown in FIG. 1.2, the system may include one or more of a database (150), one or more local environments (e.g., local environment X (152), local environment Y (154)) used by corresponding users (e.g., user X (151-1), user Y (151-2)), and a data manager (156). Each of these components is discussed below.

In one or more embodiments, a database (150) is any type of storage mechanism and/or device (e.g., a file system, collection of tables, or any other storage mechanism) for storing data volumes, which are collections of data items such as global data (165). Further, the database (150) may span multiple different storage units and/or devices. The multiple different storage units and/or devices may or may not be of the same type or located at the same physical site.

In one or more embodiments, the database (150) may include functionality to store E&P data. E&P data corresponds to data relating to an oilfield and/or aspects of exploration and production. The E&P data may include data stored in the database (150) gathered directly from sensors located at the oilfield. The E&P data stored in the database (150) may include processed data, simulation results, and other types of data from the oilfield. Other data may be in the database (150) without departing from the scope of one or more embodiments. An example of these various types of data is shown in FIG. 1.2 as global data (165).

Continuing with FIG. 1.2, a local environment (e.g., local environment X (152), local environment Y (154)) is hardware and/or software that provides the execution environment for an application. For example, the local environment may be a physical server, a personal computer, a network terminal, a group of servers, an operating system, a virtual machine, or any other hardware and/or software or combination thereof. In one or more embodiments, local environments are remote (i.e., physically separated) from each other, the database (150), and data manager (156).

In one or more embodiments, each local environment (e.g., local environment X (152), local environment Y (154)) includes an application (e.g., application X (158), application Y (160)), a sandbox (e.g., sandbox X (162), sandbox Y (164)), and a sandbox data agent (e.g., sandboxed data agent X (166), sandboxed data agent Y (168)). Each of these components is discussed below.

In one or more embodiments, an application (e.g., application X (158), application Y (160)) is a software program that includes functionality to read and/or manipulate data items (e.g., local data X (164-1), local data Y (164-2)) in the corresponding sandbox (e.g., sandbox X (162), sandbox Y (164)). In one or more embodiments, each application accesses the application's own corresponding sandbox. Further, each application may be prohibited from accessing other application's corresponding sandbox. In one or more embodiments, applications may be instances of the same software program or different software programs. For example, one application may be an oilfield pipeline simulator while another application simulates the wellsite. By way of another example, at least some of the applications may be E&P interpreter(s), which is an application(s) used to estimate properties of a subterranean formation (e.g., subterranean formation (104) shown in FIG. 1.1) based on data collected during survey operations of the subterranean formation. For example, a seismic interpreter is an E&P interpreter that is used to estimate subterranean geological structures based on seismic survey data.

In one or more embodiments, a sandbox (e.g., sandbox X (162), sandbox (164)) is (or includes) a local data repository that isolates data (e.g., local data X (164-1), local data Y (164-2)) from the database (150). In other words, updates to the sandbox are not automatically propagated to the database (150) in one or more embodiments. Further, prior to storing updates to the sandbox in the database (150), the updates may be validated using one or more rules for quality control. In some embodiments, a user of the local environment may initiate the updating of the data to the database (150). The updates may be prevented from storage in the database (150) without prior approval by an administrator user. Thus, the sandbox provides a mechanism for maintaining the integrity of data in the database (150).

In one or more embodiments, the local data repository and the database (150) are located on different machines and physically separated from each other. In one or more embodiments, the local data repository and the database 150) are communicatively coupled such that they can exchange data. The local environment (e.g., local environment X (152), local environment Y (154)) having local data repository communicatively coupled to the database (150) is referred to as a connected local environment. The connection may be temporary or permanent. For example, the connection may be through one or more communication sessions. In one or more embodiments, exchange of data between the local data repository and the database (150) are permission based. In one or more embodiments, a local environment may be deemed a connected local environment when the local environment has the authorization or permissions to access the database (150) and/or the database (150) has the authorization or permissions to access the local environment.

In one or more embodiments, the sandbox (e.g., sandbox X (162), sandbox Y (164)) is specified by a user (e.g., user X (151-1), user Y (151-2)) as part, of configuring where the application (e.g., application X (158), application Y (160)) accesses data within the local environment (e.g., local environment X (152), local environment Y (154)). For example, the local data. X (164-1) may include new data for storage in the database (150) to update or create a corresponding portion of the global data (165). Similarly, the local data Y (164-2) may include new data for storage in the database (150) to update or create another corresponding portion of the global data (165). In another example, the local data X (164-1) may be obtained from the database (150) as a copy of the corresponding portion of the global data (165). Similarly, the local data Y (164-2) may be obtained from the database (150) as a copy of another portion of the global data (165). Accordingly, the global data (165) is accessible by both the local environment X (152) and local environment Y (154). In other words, the database (150) is shared by connected local environments (e.g., local environments having individual sandboxes communicatively coupled to the database (150) to exchange data); in particular, the applications in connected local environments may share the database (150). In one or more embodiments, the local data X (164-1) and local data Y (164-2) may correspond to software code or data for manipulation by software code. In one or more embodiments, the sandbox (e.g., sandbox X (162), sandbox Y (164)) may be used to protect global data (e.g., global data (165)) in the database (150) and prevent the introduction of errors by the corresponding application (e.g., application X (158), application Y (160)) until such data is vetted.

In one or more embodiments, the sandboxed data agent X (166) and sandboxed data agent Y (168) include functionality to monitor and/or manage data (e.g., local data X (164-1), local data Y (164-2)) in the sandbox X (162) and sandbox Y (164), respectively. Specifically, the sandboxed data agent includes functionality to identify data items in the sandbox, obtain metrics about the data items (e.g., latency to access the data, amount of data, format of the data), and manage the interaction between the data items in the sandbox and the database (150).

Continuing with FIG. 1.2, in one or more embodiments, the data manager (156) includes functionality to implement a centralized management scheme for data in the sandboxes. For example, the centralized management scheme may include a version control system and additional functionality described in detail below. Specifically, the data manager (156) includes functionality to obtain the data item identifiers and metrics from the sandboxed data agent and send instructions to the sandboxed data agent. In one or more embodiments, the data manager (156) may control the storage of data items from the sandboxes to the database (150). For example, the sandboxed data agent (e.g., sandboxed data agent X (166), sandboxed data agent Y (168)) may submit the data item identifiers and metrics to the data manager (156) for storing in the database (150) as tracking metadata.

The data item identifiers and metrics that describe data items in the local data repository are referred to as metadata or tracking metadata. In one or more embodiments, the tracking metadata includes one or more of an identifier, location, update date, and parentage of the data items. For example, the metadata of the modeled drilling data may include the identifier and location of the planned drilling site, as well as a creation date of the modeled drilling data and parentage relationship to the seismic data copied from the database (150). In one or more embodiments, the metadata includes a pattern of the data items, such as a trend of the modeled drilling data. In one or more embodiments, the metadata includes a latency for accessing the data items in the local data repository.

The tracking metadata may also include a quality indicator that defines an importance level of each data item. For example, the quality indicator may correspond to a criticality level of the data item with respect to the project and/or a workflow status indicator indicating the work flow status of the data item. The criticality level may be, for example, highly critical, medium critical, or low critical, and may indicate the importance of using the most recent and correct version of the data item to the overall project of each user. The workflow status indicator may indicate, for example, whether the data item is being worked on by the user, under review, or whether the work on the data item is complete. A data item may be considered as being worked on even when the user is not actively modifying the data item; for example, the user may have the data item unopened in the user's sandbox, and the workflow status indicator may still indicate that the data item is being worked on because the user has not completed modifications to the data item. A data item may be in an under review workflow state when another user is reviewing the data item which is finished by the user, such as for completeness and accuracy. A data item may be in a complete workflow state when the review of the data item is complete.

The quality indicator may be used to generate a synchronization status that indicates whether the data item should be published to the database (150) and/or published to other user's sandboxes. For example, a rule may exist that any highly critical data item which is complete must be stored in the database (150) and replace the pending data items that are in other user's sandboxes. In such a scenario, based on the quality indicator of the data item indicating highly critical and complete, the data manager (156) may automatically store the data item to the database (150) and, without user intervention or pre-approval, store the data item in each user's sandbox that has a version of the data item. By way of another example, a rule may exist that any medium critical data item which is complete should be stored in the database (150) and replace the pending data items that are in other user's sandboxes. In such a scenario, based on the quality indicator of the data item indicating medium critical and complete, the data manager (156) may automatically store the data item to the database (150) and send notifications to users having a version of the data item that a newer, correct version data item is available and should be stored in the user's sandbox.

As shown in FIG. 1.2, data item identifiers and metrics of local data X (164-1) may be stored as tracking metadata X (162-1), while data item identifiers and metrics of local data Y (164-2) may be stored as tracking metadata Y (162-2) in the database (150). In one or more embodiments, the data manager (156) is configured to determine, based on the tracking metadata X (162-1) and tracking metadata Y (162-2), a synchronization status of the local data X (164-1) and the local data Y (164-2). The synchronization status represents a relationship between local data (such as local data X (164-1)) and at least a portion of the global data (165) corresponding to the local data. The synchronization status associated with local data Y (164-2) represents a relationship between the local data Y (164-2) and a portion of the global data (165) corresponding to the local data Y (164-2).

In one or more embodiments, the data manager (156) is further configured to analyze the synchronization status to generate a synchronization status report. Accordingly, the synchronization status report may be presented to an administrator user (not shown) of the data manager (156). Further, the synchronization status report may be sent to the user X (151-1) of the local environment X (152) and/or the user Y (151-2) of the local environment Y (154), Additional details of the functionality of the sandboxed agent and the data manager (156) are described in reference to the method flowchart shown in FIG. 2 and the example operation diagrams shown in FIGS. 3.1 and 3.2 below.

While FIG. 1.2 shows a configuration of components, other configurations may be used without departing from the scope. For example, various components may be combined to create a single component. As another example, the functionality performed by a single component may be performed by two or More components.

FIG. 2 depicts an example method in accordance with one or more embodiments. In one or more embodiments, one or more of the elements shown in FIG. 2 may be omitted, repeated, and/or performed in a different order. Accordingly, embodiments of the method and system for sandbox visibility should not be considered limited to the specific arrangements of elements shown in FIG. 2.

In one or more embodiments, the method depicted in FIG. 2 may be practiced using the E&P computer system (118) described in reference to FIGS. 1.1 and 1.2 above. As described above, the E&P data is accessible by multiple local environments that are remote from a database (150) and are remote from each other. In particular, each local environment includes an application and a corresponding local data repository. Accordingly, each local environment may correspond to a user project for modeling or otherwise analyzing the E&P data using the data items in the local data repository. For example, in addition to the drilling modeling, project in a local environment of a drilling engineer, another local environment may be used by a production planner user to model future production capacity of the planned drilling site. The production planner user may also access the E&P data in the database (150). In one or more embodiments, a data manager (e.g., a software module) of the database (150) implements a centralized management scheme for accessing the E&P data by these multiple local environments (i.e., multiple user projects).

Initially in Element 211, data items in a local data repository located in a local environment are detected. In particular, the data items correspond to E&P data in a database (150). In one or more embodiments, the data items include a copy of the E&P data in the database (150). The copy of the E&P data may be retrieved from the database (150) into the local environment by an application. For example, the application may be used to model or otherwise analyze field exploration and/or production. In such embodiments, the data items are input to the application. In one or more embodiments, the data items include new data for storage in the database (150) to expand the E&P data. For example, the new data may be generated by the field E&P application. In such embodiments, the data items are output from the application. For example, the E&P data in the database (150) may initially exclusively include location and seismic data of a planned drilling site. The seismic portion of the E&P data may be copied into the local data repository as input (referred to as first data items) to a drilling modeling application. Based on the first data items, modeled drilling data (referred to as second data items) is generated by the drilling modeling application during a drilling modeling project. After the drilling modeling project is complete, final version of the second data items may be submitted to the database (150) to expand the E&P data of the planned drilling site. After the expansion, the E&P data in the database (150) include location, seismic data, and modeled drilling data of the planned drilling site. In one or more embodiments, the data items in the local data repository are detected according to a pre-determined schedule (e.g., hourly, daily, weekly, monthly, or other recurring schedule) or triggered by a pre-determined event. For example, the aforementioned modeled drilling data may be detected according to a daily scheduled throughout a multi-week drilling modeling project. In another example, the aforementioned modeled drilling data may be detected according to a milestone event of the multi-week drilling modeling project.

In Element 212, in response to detecting, the data items in the local data repository, metadata is collected by a computer processor of the local environment. In one or more embodiments, an identifier, location, update date, and/or parentage of the data items are extracted or otherwise derived from the data items as the metadata. For example, the identifier and location of a planned drilling site, as well as a creation date of modeled drilling data and parentage relationship to seismic data may be extracted/derived as the metadata of the modeled drilling data. In one or more embodiments, the data items are analyzed to detect a pattern of the data items that is stored as part of the metadata. In one or more embodiments, a latency for accessing the data items in the local data repository is determined from a configuration file of the computer processor and stored as part of the metadata.

In Element 213, the metadata is transmitted to the data manager (156) of the database (150). As noted above, a portion of the data items (e.g., the aforementioned first data items) may be retrieved by the application from the database (150) to be used as input, of the application. In addition, another portion of the data items (e.g., the aforementioned second data items) may be generated by the application and submitted to the database (150) for storage. In one or more embodiments, the metadata is transmitted to the data manager (156) when the corresponding portion of the data items is submitted to and/or retrieved from the database (150). For example, metadata of the aforementioned modeled drilling data may be transmitted to the data manager (156) when the final version of the modeled drilling data is submitted to the database (150). In one or more embodiments, the metadata is transmitted to the data manager (156) independent of any of the data items being submitted to and/or retrieved from the database (150). In such embodiments, the metadata may be transmitted to the data manager (156) separate from the data items. In one or more embodiments, the metadata may be transmitted to the data manager (156) according to the aforementioned pre-determined schedule or triggered by the pre-determined event. For example, tracking metadata of the aforementioned modeled drilling data may be transmitted to the data manager (156) on a daily basis throughout the multi-week drilling modeling project while the modeled drilling data is not submitted to the database (150) until the multi-week drilling modeling project is completed.

In Element 214, based on the metadata, a synchronization status of the data items in the local data repository is determined by the data manager (156). Specifically, the synchronization status represents a relationship between the data items in the local data repository and the E&P data in the database (150). In particular, the relationship between the data items and the E&P data is defined according to the centralized management scheme implemented by the data manager (156). For example, the synchronization status may include a new status, an obsolete status, a to-be-deleted status, or other pre-defined status. The new status may be determined by identifying that the data items in the local data repository are not yet checked into the database (150) by the data manager (156) and the corresponding E&P data is a place holder in the database (150). The obsolete status is determined by identifying that the data items in the local data repository are an old copy of the corresponding E&P data in the database (150) and are in need of update. The to-be-deleted status is determined by identifying that the E&P data in the database (150) is an old copy of the data items in the local data repository and is pending to be deleted. For example, the synchronization status of the aforementioned modeled, drilling data (i.e., second data items) may be determined as new status by the data manager (156) on the daily basis throughout the multi-week drilling modeling project until the multi-week dill hug modeling project is completed and the final version of the modeled drilling data is submitted to (e.g., checked into) the database (150).

In Element 215, the synchronization status is analyzed by the data manager (156) to generate a synchronization status report. In one or more embodiments, the synchronization statuses of multiple sets of data items from multiple local environments are aggregated to generated the synchronization status report. In one or more embodiments, the synchronization status report identifies which data item(s) in which user projects are obsolete so that the user of the identified user project may be alerted or otherwise notified. For example, the synchronization status e.g., obsolete) may be determined based on a user project identifier (e.g., identifying a drilling location of a drilling modeling project) included in the tracking metadata. A project identifier is data that may identify, alone or in combination with other data, the associated project. In certain embodiments, the project identifier identifies the drilling location and/or the subsurface modeling project. In one or more embodiments, in a more controlled environment, push updates may be implemented to automatically replace the obsolete data item(s). In one or more embodiments, the synchronization status report identifies thresholds of unsaved data above which a user may be reminded to save his/her work. The unsaved data may be new data generated by the application in the local environment that has not been checked into the database (150) by the data manager (156) according to the centralized management scheme. In other words, the data items in the local environment may be tracked using metadata regardless of whether the data items themselves are checked into the database (150) or not. For example, the aforementioned drilling engineer may be automatically notified/alerted by the data manager (156) on any given day during the multi-week drilling modeling project when the modeled drilling data in the local data repository exceeds a pre-defined size threshold or a pre-defined revision count threshold. In other words, the status of the modeled drilling data may be tracked by the data manager (156) based on the drilling modeling project identifier even though the modeled drilling data is seldomly checked into the database (150). Accordingly, the drilling engineer may decide to check in an interim version of the modeled drilling data prior to completing the multi-week drilling modeling project.

In one or more embodiments, the synchronization status report is presented to an administrator user of the data manager (156). For example, the synchronization status report may include a data view to allow the administrator user to view metadata from local environments to determine which user(s) have a particular data item and to determine if the particular data item is still synchronized, outdated, or newer in the user's local environment than the corresponding version in the database (150).

For example, the data items in a first local data repository may be a first copy of the E&P data in the database (150). The data items (referred to as the first copy) may change in the first local data repository as the user models field. E&P in the corresponding first local environment. During a period of time, the local change of the first copy is not submitted to the data manager (156) to update the E&P data in the database (150). Although the changed data items themselves are not submitted to the data manager (156), tracking metadata of the changed data items is submitted to the data manager (156) according to the pre-determined schedule or as triggered by a pre-determined event. This tracking metadata indicates the change status of the first copy in the first local environment. Accordingly, another project in a second local environment that has also copied the E&P data in the database (150) is notified of the local change of the first copy in the first local environment.

In one or more embodiments, the synchronization status report includes a set of graphical views/charts organized by data type or user. Such graphical views/charts allow the administrator user to understand the data publication and data consumption trends for the users. For example, the data publication and data consumption trends may include statistics of time lag from data item creation to when the data item was sent to the database (150). In another example, the data publication and data consumption trends may include statistics of time lag from an update of E&P data in the database (150) to copying the updated E&P data into user projects as local data items. In yet another example, the data publication and data consumption trends may include statistics of counts and classification of items in the database (150) that have not been copied into local data items by any user.

In one or more embodiments, the synchronization status report is sent to users of the local environments. For example, the synchronization status report may provide local data visibility to a new user (e.g., a new asset team member) to use a colleague's project as a template for his/her own new project. In another example, the synchronization status report allows the user to efficiently sort and filter data items in his/her local data repository by their synchronization status. For example, the synchronization status report may indicate the aforementioned new status of the modeled drilling data generated by the drilling modeling project in the drilling engineer's local environment. By sending the synchronization status report to the production planner user in addition to the drilling engineer and the administrator user, the production planner user may request to use the drilling engineer's drilling modeling project as a template to initiate a production modeling project in the production planner user's local environment. Once the production modeling project is initiated, the production planner user may use the on-going releases of the synchronization status report to keep track of the synchronization status of his/her copy of the modeled drilling data with respect to revisions of the drilling engineer's modeled drilling, data. In such embodiments, based on the metadata of the modeled drilling data and the synchronization status report automatically published by the data manager (156), the production planner user can see revisions of the modeled drilling data in the drilling engineer's local environment even though these revisions are not submitted to the database (150) during the multi-week drilling modeling project prior to the completion.

Examples of the E&P computer system (118), application X (158), and application Y (160) shown in FIG. 1.2 above include the software products/tools Petrel® software and Studio® software, which are Schlumberger Technology Corporation products/tools. Petrel® and Studio' are registered trademarks of Schlumberger Technology Corporation, located in Houston, Tex., United States of America. One skilled in the art having benefit of this disclosure will appreciate that when referring to Petrel® software or Studio® software, it is simply an example of an E&P software platform or tool and could be replaced with any similar E&P software platforms or tools designed to increase reservoir performance by improving asset team productivity where geophysicists, geologists, and reservoir engineers can develop collaborative workflows and integrate operations to streamline processes. While many of the provided embodiments and examples relate to E&P, the processes described herein are not limited to the E&P domain.

In one or more embodiments, sandboxes, applications, and local environments are defined for user projects. In one or more embodiments, Petrel® software user projects are the sandboxes (e.g., sandbox X (162), sandbox Y (164) shown in FIG. 1.2 above) which are used against a database (e.g., database (150) shown in FIG. 1.2 above) embodied within the Studio® software domain. Within Petrel® software, users (e.g., user X (151-1), user Y (151-2)), through subscriptions, may subscribe to folders or at higher levels across which users are working to get updates to data (e.g., global data (165) shown in FIG. 1.2 above) uploaded to the Studio® software database within these folders.

One or more embodiments may be conceptually referred to as "breadcrumbs" because of the trail of information that is captured from Petrel® software projects (individual user sandboxes) which facilitate actions by an administrator to monitor and control elements of the data environment according to the three dimensions of knowledge management, major updates, and best practices. More specifically, "breadcrumbs" are examples of tracking metadata X (162-1) and tracking metadata Y (162-2) shown in FIG. 1.2 above. The tracking metadata may be relatively small amounts of tracking information e.g., identity, location, update date, parentage) about pieces of data a user has been working with locally. In embodiments where the amount of metadata that is tracked is small, collecting and updating the tracking metadata may occur in the background without affecting the user's workflow or creating undue load on the network or repository. In such embodiments the tracking metadata may be kept up-do-date as long as the users are connected to the repository.

For each sandboxed environment (e.g. local environment), the database (150) may be connected to occasionally pull information or to get updates to data being worked on in a team through folder subscriptions. When the connection is made, a sandboxed data agent (e.g., a transparent script) may be run on the sandboxed environment. The data agent may gather information from a user's sandbox. This information may be used for assessment or actions related to the above three dimensions. The information and any processing required to produce indicators or actions for follow up may be done in the database (150) and presented to the data manager (156). In one or more embodiments, it may be impractical to maintain copies of information in the user's sandbox in the database (150) for storage space, portability and performance reasons.

The scope of benefit is broader than below, but below are three examples which illustrate possible benefits of one or more embodiments. These benefits are given by way of example, and not all embodiments will necessarily achieve all or any of these benefits. Certain embodiments may achieve benefits other than those described.

With respect to best practices, what data users have in their own sandboxed environment is often not centrally known or discernable based on data obtained from the database (150). For example, users may load data into their own projects independently. Users often load and organize data in their individual environments in ways which are difficult to control, and often do not follow knowledge management conventions and best practices defined, by the organization. By subsequently sending data which does not follow company standards or knowledge sharing best practices to the database (150) or to other users (and subsequently to the database (150)) data can quickly take on forms that make it difficult to understand and use by others who may otherwise potentially derive value from it. A common approach to data management has been to cleanup information in a reactive manner, which does not help control and reduce problem occurrence. Another common approach has been to define rules at the database level which prevent data from being entered in a corrupt way. However, the above approaches are not completely effective.

First, users often want to do the easiest thing at a given moment. Best practices, while interesting to document and understood as being best for the company, are often not followed as a trade of for speed in getting a job done in the shortest time. This problem grows over the life of a project as value is added to data (often by multiple persons) and it becomes increasingly difficult to retroactively conform the data to standards.

Second, users of the data are often not well versed in understanding, knowing or keeping up to date on organizational best practices and standards. Users generally locus on trying to make progress in the fields of expertise in which they specialize.

Third, users often have difficulty finding data when the data does not conform to standards. This often results in re-creation of data, re-interpretations, and other forms of duplicated efforts due to failure to capitalize on existing sources of knowledge in the company because they cannot be found.

Fourth, enforcing too many standards on data entry to the database may impose too much effort on users who are skilled yet untrained in data management. The standards may be more efficiently handled by specialized data managers, allowing the users to focus on their domains.

Tracking metadata may assist with best practices. In the area of best practices in the Petrel® software and other database environments, a unique identifier (referred to as a global unique identifier (GUID) may be used to identify identical objects in the Petrel® software and/or Studio® software environment). Many E&P interpretation applications and databases keep data organized in a tree structure to facilitate understanding data items (and relationship between data items) and browsing data. Organizations may have data organization conventions to help people more easily understand the data. The conventions may be easily updateable in the database. People bringing in new data from the database will understand these conventions. For data items that exist in the database and sandboxes, data administrators, based on tracking metadata such as "breadcrumbs", may be able to assess how non-conformant data in sandboxes compares to what is in the database. The "breadcrumbs" may assist in identifying users for training. In addition, the "breadcrumbs" may allow for early intervention to help prevent data from deteriorating with respect to standards, by forcing or asking users to synchronize the structure of data in the user's local sandboxes with the database. The synchronization of the structure of data may be independent of synchronizing the data itself. Depending on whether the organization determines that the structure of the user's data is acceptable, the user's organized data may be propagated to the database or kept independent of the database.

With respect to knowledge sharing, due to the nature of the sandboxed environment, users may have data in their local projects that is not shared with the database. In certain circumstances, large amounts of unshared data (or data which has not been synchronized in a long time) may be a cause for concern. By extracting tracking metadata through "breadcrumbs" to identify data latency, action may be taken to improve knowledge sharing. For example, one or more embodiments may determine whether someone loads a large amount of data to his or her local sandbox without making that data available to others through the database.

By way of an example of best practices and knowledge sharing. FIG. 3.1 shows schematic diagrams of operations in accordance with one or more embodiments. In block 201, the user project or sandbox connects to database with or without sending/retrieving data. In block 203, the transparent sandboxed data agent auto-executes to collect data about the user's project. In block 205, metadata on data items in the user project is sent to database. For example, the metadata may be sent by the sandboxed data agent to the database. In block 207, tracking metadata from individual user projects is stored to display performance indicators that represent adherence to standards on knowledge sharing and best practices. For example, the data manager (such as the data manager (156)) may store the tracking metadata. In an example scenario, tracking metadata indicating a change to the local data in a first local environment is sent to the database without sending/retrieving the corresponding data. In other words, the tracking metadata is sent without synchronizing the changed local data in the first local environment and the corresponding global data in the database. Accordingly, the data manager is notified of the change of local data and may in turn notify other local environments that have other copies of the global data (or local versions of that global data) in their local data repositories. In summary, sandboxes in different local environments may exchange tracking metadata that includes local data change status via the data manager without actually sending/retrieving data to/from the database.

With respect to major updates, in one or more embodiments the system identifies users who need to receive major updates to the data in their projects based on major updates made to data in the database. Users may have local data in their projects that has to be deleted or updated to avoid costly mistakes and/or unnecessary rework. Through use of one or more embodiments, local data that is out of date may be identified and scripts run that update the local data forcibly or through user intervention. Thus, one or more embodiments allow data to be updated in each individual user's projects when they connect to the database. For example, after data is deleted in the database, the data may continue to exist in the database in an area similar to a recycle bin. The data may continue to be referenced until local projects/sandboxes which have been identified as having this data through "breadcrumbs" delete this data in their projects. The data manager may prevent data that has been deleted in the database from being re-uploaded to the database from local environments during data transfers from the local environment to the database.

By way of an example of major updates, FIG. 3.2 shows schematic diagrams of operations in accordance with one or more embodiments. In block 301, the user project or sandbox connects to the database with or without sending/retrieving data. In block 303, the transparent sandboxed data agent auto-executes to collect tracking metadata about a user's project. In block 305, tracking metadata on data items in user project is sent to database. The metadata may be sent by the sandboxed data agent. In block 309, a portion of data used in some user projects is deleted from the database (referred to as deleted data). In block 307, based on the metadata, the deleted data is stored in a recycle bin area of the database after deletion. Records of projects that still have local copies of the deleted data may also be stored in the database. In block 311, a sandboxed data agent for a user project which has local copies of the deleted data is run upon connection to the database. The sandboxed data agent may ensure the copies of the deleted data is also deleted locally in sandbox. In block 313, it is confirmed that each project which has deleted data have deleted the data from their local projects. In block 315, the deleted data is permanently deleted from the database after all local copies are deleted in user projects. For example, the deleted data may be permanently deleted, from the recycle bin.

Figure 4:
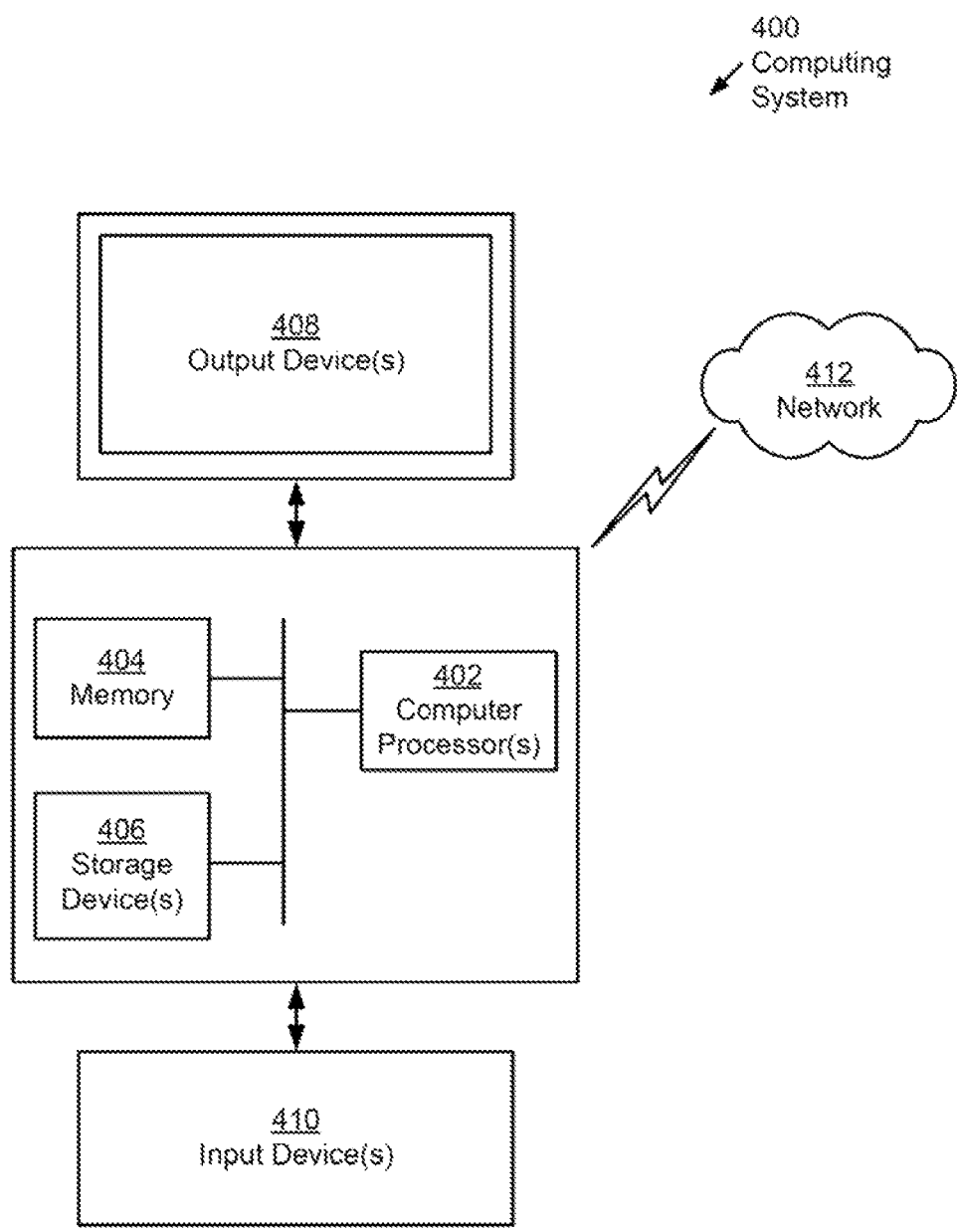
FIG. 4 shows a computer system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. In particular, one or more of the local environment(s), data manager, database, E&P computer system described in reference to FIG. 1.2 above may be implemented on such computing system. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (400) may be located at a remote location and connected to the other elements over a network (412). Further, embodiments may be implemented on a distributed system having a plurality of nodes, where each portion may be located on a different node within the distributed system. In one embodiment, the node corresponds to a distinct computing device. The node may correspond to a computer processor with associated physical memory. The node may correspond to a computer processor or micro-core of a computer processor with shared memory and/or resources.

While various embodiments have been described with respect to a limited number of embodiments, those skilled in the art, having benefit of this disclosure, will appreciate that other embodiments can be devised which do not depart from the scope as disclosed herein.

What is claimed is:

1. A method for local data visibility comprising:
   detecting a plurality of data items in a local data repository located in a local environment;
   collecting, by a computer processor of the local environment and in response to the detecting, metadata comprising a local data change status of the plurality of data items in the local data repository;
   transmitting the local data change status separate from the plurality of data items to a data manager of a database, wherein the database is accessible by a plurality of local environments comprising the local environment;
   determining, by the data manager and based on the local data change status, a synchronization status of the plurality of data items in the local data repository, wherein the synchronization status represents a relationship between the plurality of data items in the local data repository and exploration and production data in the database; and
   generating, by the data manager and according to a pre-determined data management scheme, an alert based on the synchronization status.

2. The method of claim 1, further comprising:
   aggregating, by the data manager, the synchronization status for the plurality of local environments to generate a synchronization status report; and
   presenting the synchronization status report to an administrator user of the data manager.

3. The method of claim 2, further comprising:
   sending the synchronization status report to a plurality of users of the plurality of local environments.

4. The method of claim 1, wherein the plurality of data items comprises a copy of the exploration and production data in the database.

5. The method of claim 1, wherein the plurality of data items comprises new data for storage in the database to expand the exploration and production data.

6. The method of claim 1, wherein the metadata further comprises at least one selected from a group consisting of a location, an update date, a parentage of the plurality of data items, a pattern of the plurality of data items, and a latency for accessing the plurality of data items in the local data repository.

7. The method of claim 6, wherein the synchronization status is determined further based on at least one selected from a group consisting of the location, the update date, the parentage of the plurality of data items, the pattern of the plurality of data items, and the latency for accessing the plurality of data items in the local data repository.

8. The method of claim 1, wherein the metadata further comprises an importance level of the plurality of data items that is transmitted separate from the plurality of data items to the data manager for determining the synchronization status.

9. A system for local data visibility comprising:
a database comprising exploration and production data, wherein the exploration and production data is accessible by a plurality of local environments;
a data manager coupled to the database and the plurality of local environments, wherein the data manager is configured to manage the exploration and production data in the database for the plurality of local environments; and
a local environment of the plurality of local environments, wherein the local environment comprises:
a local data repository;
a computer processor; and
memory storing instructions, when executed by the computer processor, comprising functionality to:
detect a plurality of data items in the local data repository;
collect, in response to the detecting, metadata comprising a local data change status of the plurality of data items in the local data repository; and
transmit the local data change status separate from the plurality of data items to the data manager,
wherein the data manager is further configured to:
determine, based on the local data change status, a synchronization status of the plurality of data items in the local data repository, wherein the synchronization status represents a relationship between the plurality of data items in the local data repository and the exploration and production data in the database; and
generate, according to a pre-determined data management scheme, an alert based on the synchronization status.

10. The system of claim 9, wherein the data manager is further configured to:
aggregate the synchronization status for the plurality of local environments to generate a synchronization status report; and
present the synchronization status report to an administrator user of the data manager.

11. The system of claim 10, wherein the data manager is further configured to:
send the synchronization status report to a plurality of users of the plurality of local environments.

12. The system of claim 9, wherein the plurality of data items comprises a copy of the exploration and production data in the database.

13. The system of claim 9, wherein the plurality of data items comprises new data for storage in the database to expand the exploration and production data.

14. The system of claim 9, wherein the metadata further comprises at least one selected from a group consisting of a location, an update date, a parentage of the plurality of data items, a pattern of the plurality of data items, and a latency for accessing the plurality of data items in the local data repository.

15. The system of claim 14, wherein the synchronization status is determined further based on at least one selected from a group consisting of the location, the update date, the parentage of the plurality of data items, the pattern of the plurality of data items, and the latency for accessing the plurality of data items in the local data repository.

16. The system of claim 9, wherein the metadata further comprises an importance level of the plurality of data items that is transmitted separate from the plurality of data items to the data manager for determining the synchronization status.

17. A non-transitory computer readable medium embodying instructions for local data visibility, the instructions when executed by a computer processor comprising functionality for:
detecting a plurality of data items in a local data repository located in a local environment;
collecting, within the local environment and in response to the detecting, metadata comprising a local data change status of the plurality of data items in the local data repository;
transmitting the local data change status separate from the plurality of data items to a data manager of a database, wherein the database is accessible by a plurality of local environments comprising the local environment;
determining, by the data manager and based on the local data change status, a synchronization status of the plurality of data items in the local data repository, wherein the synchronization status represents a relationship between the plurality of data items in the local data repository and exploration and production data in the database; and
generating, by the data manager and according to a pre-determined data management scheme, an alert based on the synchronization status.

18. The non-transitory computer readable medium of claim 17, the instructions when executed by the computer processor further comprising functionality for:
aggregating, by the data manager, the synchronization status for the plurality of local environments to generate a synchronization status report; and
presenting the synchronization status report to an administrator user of the data manager.

19. The non-transitory computer readable medium of claim 18, the instructions when executed by the computer processor further comprising functionality for:
sending the synchronization status report to a plurality of users of the plurality of local environments.

20. The non-transitory computer readable medium of claim 17,
wherein the plurality of data items comprises at least one selected from a group consisting of:
a copy of the exploration and production data in the database; and
new data for storage in the database to expand the exploration and production data,
wherein the metadata further comprises at least one selected from a group consisting of a location, an update date, a parentage of the plurality of data items, a pattern of the plurality of data items, and a description of a latency for accessing the plurality of data items in the local data repository, and
wherein the synchronization status is determined further based on at least one selected from a group consisting of the location, the update date, the parentage of the plurality of data items, the pattern of the plurality of data items, and the latency for accessing the plurality of data items in the local data repository.

* * * * *